(12) United States Patent
Blaukopf et al.

(10) Patent No.: US 7,080,387 B2
(45) Date of Patent: Jul. 18, 2006

(54) SYSTEM AND METHOD FOR MEDIATING COMMUNICATION BETWEEN SOFTWARE APPLICATIONS

(75) Inventors: Daniel Blaukopf, Raanana (IL); Ioi K. Lam, Mountain View, CA (US); Eran Davidov, Nahariya (IL); Dov Zandman, Rosh Ha'Ayin (IL)

(73) Assignee: Sun Microsystems, Inc., Santa Clara, CA (US)

( * ) Notice: Subject to any disclaimer, the term of this patent is extended or adjusted under 35 U.S.C. 154(b) by 383 days.

(21) Appl. No.: 09/963,942

(22) Filed: Sep. 26, 2001

(65) Prior Publication Data

US 2002/0095521 A1    Jul. 18, 2002

Related U.S. Application Data

(60) Provisional application No. 60/235,915, filed on Sep. 28, 2000, provisional application No. 60/235,916, filed on Sep. 28, 2000, provisional application No. 60/235,917, filed on Sep. 28, 2000.

(51) Int. Cl.
*G06F 9/44*    (2006.01)

(52) U.S. Cl. ........................... 719/328; 719/313

(58) Field of Classification Search ............... 719/310, 719/313, 328; 717/136
See application file for complete search history.

(56) References Cited

U.S. PATENT DOCUMENTS

| | | | | |
|---|---|---|---|---|
| 5,423,042 A | * | 6/1995 | Jalili et al. ................... 719/328 |
| 5,491,800 A | * | 2/1996 | Goldsmith et al. ........... 709/221 |
| 5,680,549 A | * | 10/1997 | Raynak et al. ............... 709/227 |
| 5,719,942 A | * | 2/1998 | Aldred et al. ................ 709/228 |
| 6,005,568 A | * | 12/1999 | Simonoff et al. ............. 715/744 |
| 6,061,714 A | * | 5/2000 | Housel et al. ................ 709/203 |
| 6,066,181 A | * | 5/2000 | DeMaster ..................... 717/148 |
| 6,314,429 B1 | * | 11/2001 | Simser ..................... 707/103 R |
| 6,345,315 B1 | * | 2/2002 | Mishra ......................... 719/329 |
| 6,481,006 B1 | * | 11/2002 | Blandy et al. ............... 717/139 |
| 6,901,588 B1 | * | 5/2005 | Krapf et al. .................. 717/164 |
| 2001/0029525 A1 | * | 10/2001 | Lahr ............................ 709/218 |

OTHER PUBLICATIONS

John Bandhauer, "A zero generated code XPConnect proposal," Dec. 1998.*

* cited by examiner

Primary Examiner—William Thomson
Assistant Examiner—Li Zhen
(74) Attorney, Agent, or Firm—Robert C. Kowert; Meyertons, Hood, Kivlin, Kowert & Goetzel, P.C.

(57) ABSTRACT

A method, system and protocol suitable for mediating communication between an application written in a platform independent language, running on a specific processor or computing platform, and an application written in the processor's native language. As part of the present invention, an application written in a platform independent code may be compiled and/or linked to a first mediation module and an application written in the processor's native code may be compiled and/or linked to a second mediation module. The first and second mediation modules may communicate with each other utilizing a stream protocol providing for communication of various data types, including but not limited to function calls, function parameters, function results, and event notification.

37 Claims, 3 Drawing Sheets

SYSTEM AND METHOD FOR MEDIATING COMMUNICATION BETWEEN SOFTWARE APPLICATIONS

RELATED APPLICATIONS

The present invention claims priority from United States Provisional Applications Nos. 60/235,915, filed Sep. 28, 2000; 60/235,916, filed Sep. 28, 2000; and 60/235,917, filed Sep. 28, 2000, all of which are, hereby incorporated by reference in their entirety.

FIELD OF THE INVENTION

The present invention relates generally to the field of computer software applications. More specifically, the present invention relates to a method, system and protocol for mediating communication between software applications.

BACKGROUND OF THE INVENTION

Portability of software applications between computing platforms has been an issue among software developers and users since beginning of the software industry. Platform independent languages such as Java have been developed in order to address this issue. However, Java and other languages claiming to be platform independent require an interpreter running on the same computing platform so as to convert the platform independent code into instructions the processor upon which the code is running on can understand and execute. Because of the requirement for an additional level of processing, i.e. interpreting, code written in Java and other platform independent languages typically runs less efficiently and requires relatively greater resources than code performing the same function in a processor's native language, code compiled specifically for the processor the code is running on. Therefore, code written in Java or another platform independent language usually runs slower than functionally equivalent code in a processor's native language, machine language produced by a compiler.

One solution for speeding up the performance of applications written in platform independent languages is to offload some operations to concurrently running applications written in the processor's native language and to use a mediation protocol to interact between the two applications.

SUMMARY OF THE INVENTION

The present invention is a methods system and protocol for mediating communication between a first and second software application. As part of the present invention, an application written in a first computer language may be compiled and/or linked to a first mediation module and an application written in a second computer language may be compiled and/or linked to a second mediation module. The first and second mediation modules may communicate with each other utilizing one or more protocols, providing for communication of various data types, including but not limited to function calls, function parameters, function results, and event notification.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
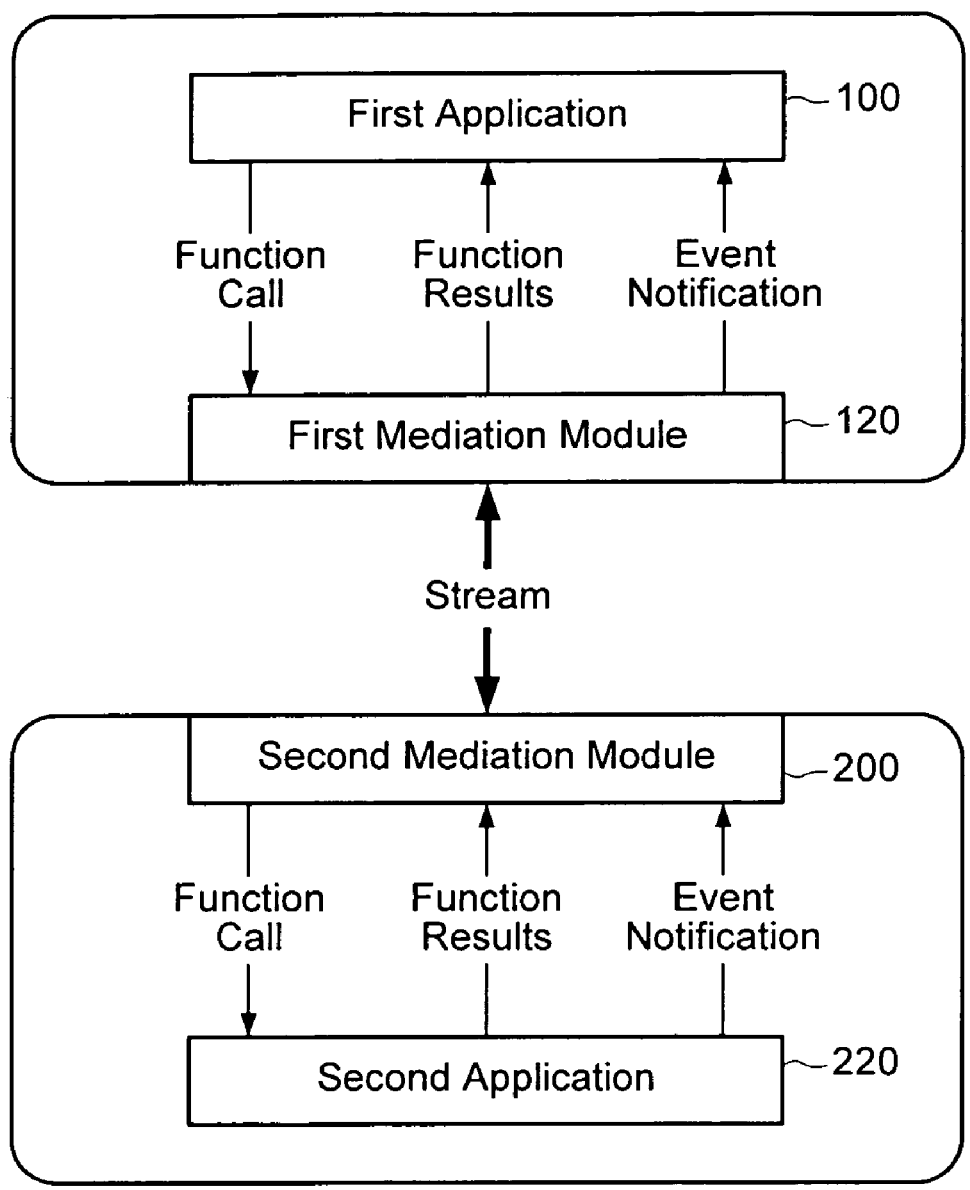
FIG. 1 Shows a diagrammatic illustration of two applications linked to and communicating through two mediation modules according to the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMS) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The present invention is a method, system and protocol suitable for mediating communication between an application written in a platform independent language, running on a specific processor or computing platform, and an application written in the processor's native language. As part of the present invention, an application written in a platform independent code may be compiled and/or linked to a first mediation module and an application written in the processor's native code may be compiled and/or linked to a second mediation module. The first and second mediation modules may communicate with each other utilizing a stream protocol providing for communication of various data types, including but not limited to function calls, function parameters, function results, and event notification.

Turning now to FIG. 1, there is shown a first application 100 linked to a first mediation module 120, both of which may run in a single process. A second application 200 is linked to a second mediation module 220. The first and second mediation modules may communicate with one another utilizing a stream protocol. In an embodiment of the present invention, the first application 100 is written in a platform independent language, e.g. Java, and the first mediation module 120 causes the second application 200, written in the processor's native code, e.g. C, to be launched. The first mediation module 120 may issue a command causing the operating system to produce an instance of the second application 200 and the second mediation module 220.

The first application 100 may pass a function call to the second application 200 through the first 120 and second 220 mediation modules, respectively. The second application 200 may pass the results of the function to the first application 100, also through the first 120 and second 220 mediation modules. In addition to passing function calls and their associated parameters, each of applications, 100 and 200, may also pass function results and event notification to the other. In one embodiment of the present invention, the application written in a platform independent or interpreted language passes a function call to an application written in the processors native code.

Figure 2:
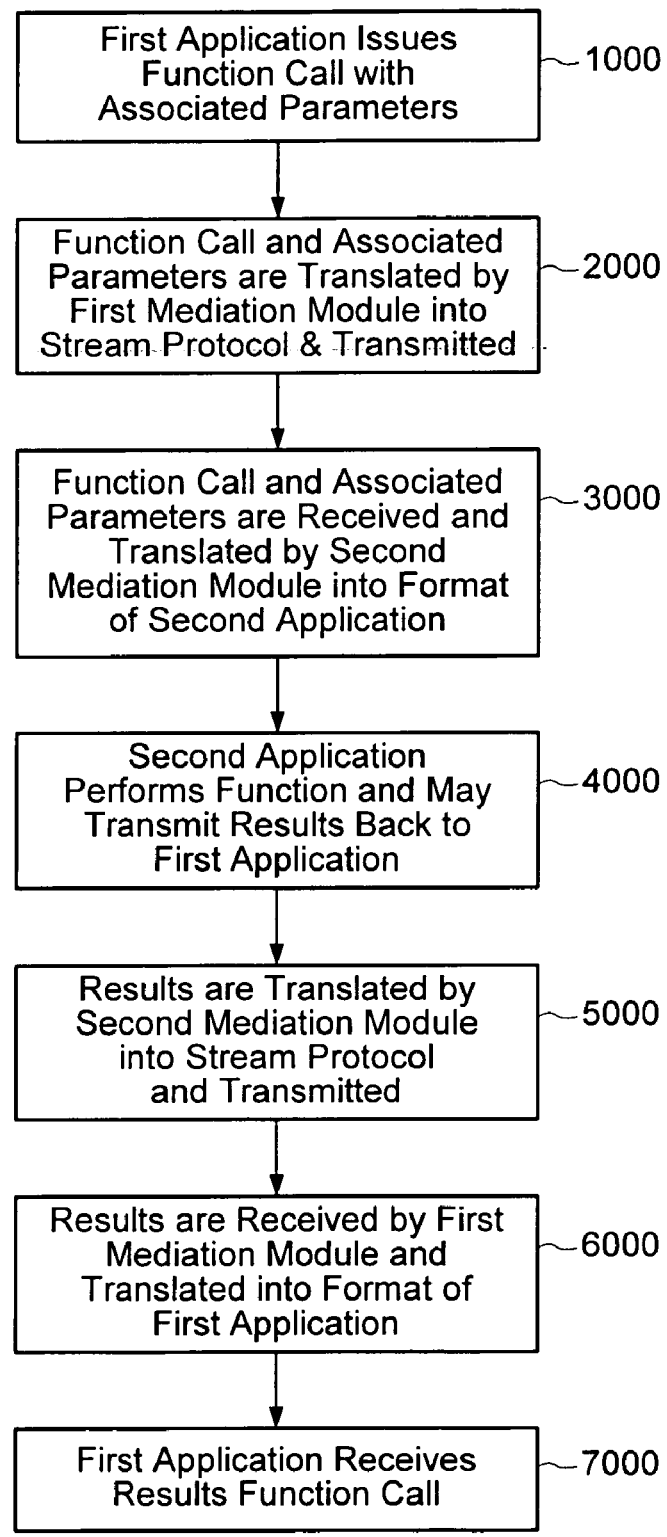
FIG. 2 Shows a flow diagram illustrating the steps of by which a first application calls a function of a second function using the mediation modules of the present invention.

Turning now to FIG. 2, there is shown a flow chart with the steps of a method according to the present invention by which a first application passes a function call to a second application. As part of step 1000, a first application 100 issues a function call for a function contained within a second application 200. The first application's function call and associated parameters are passed to a first mediation module 120 where they are translated into a stream protocol and transmitted, Step 2000. The function call and associated parameters, in the stream protocol format, are received by the second mediation module 220 and translated into a format suitable for the second application 200 (Step 3000). The second application 200 may return a value, a series of values, or some other result (Step 4000). The results may take a reverse path back the first application 100, that is, through the second mediation module (step 5000) aid through the first mediation module (step 6000). The first application 100 may receive the result in its own format (step 7000) once the first mediation module 120 converts the results from the stream protocol (step 6000).

Communication between mediation modules occurs using a stream protocol or other protocol that may provide ordered deliver of data over multiple streams, for example TCP/IP streams. A mediation protocol may be used over a communications protocol to form a stream protocol according to the present invention.

The following is an example of functions performed by a mediation protocol according to the present invention:

1. The first application may launch the second, providing it, by means of command-line arguments (or other mechanism) with numbers of two TCP/IP ports to be used for communication between the two applications. The first port number is termed the Command Port and the second the Event Port.
2. The second application, when launched, stores the command port number and event port number for future reference in a place accessible to its mediation module.
3. When the second application first attempts to perform an operation using its mediation module, it opens tip a stream for event notifications by connecting a TCP/IP client socket to the event port. This is termed the Event Stream.
4. When the second application requires that a function call be made through its mediation module, the following steps are performed:
    a. If this is the first time that a function call has been made from the system thread from which the call is made, a new stream connection is opened up for the exclusive use of this thread. This is done by connecting a TCP/IP client socket to the command port. Details of this connection are then stored for future reference. Each such stream connection has its own memory buffers, and calls through one such stream connection are executed independently of calls though another connection. This ensures thread-safety of the system.
    b. If this is not the first time that a function call has been made from the current system thread, the second application's mediation module looks up a connection it has previously stored for this thread, and uses this connection.
    c. In order to call a function, the second application first needs a reference to the function to be called. This may have been stored from a previous use of the function, or may be acquired as follows:
        i. The second application's mediation module sends a request for a function reference number to the mediation module of the first application. She request includes the package name, class name and method name of a static Java method to be invoked.
        ii. The mediation module of the first application receives the request and uses Java's reflection mechanism to identify a method that matches the request.
        iii. The meditation module of the first application allocates a reference number for the method. It then stores this number and a reference to the method in a table for future reference.
        iv. The mediation module of the first application sends the reference number along with details of the types of parameters, and the return type, of the requested method.
        v. The mediation module of the second application receives the reference number and the parameter types and return types.
        vi. The mediation module of the second application builds a data structure describing the Java method and containing the reference number. It then returns this data structure to the second application as a remote function reference.
d. The second application makes a function call through its mediation module, providing it with the following information:
i. A reference to it function, as described above
ii. The parameters to the function call
iii. A memory address where the meditation module can store the result of the function call.
e. The second application's mediation module passes the following information to the first application's mediation module;
i. The reference number of the function
ii. The parameters to the function call
f. If, and only if the function call is of a type that returns a result, the second application's mediation module waits for a result to be returned from the first application's mediation module before proceeding.
g. If the function call is of a type that does not return a result, the second application's mediation module has now completed its work for this function call, and returns control to the second application.
h. The first application's mediation module receives the reference number of the function and its parameters.
i. The first application's mediation module uses the reference number of the function to look up in a table a Java method reference that it has previously stored. This method is then invoked using Java's reflection mechanism.
j. If the function call is of a type that returns a result, the first application's mediation module sends the return result to the second application's mediation module.
k. The second application's mediation module returns the result of the function call to the second application.
5. When the first application requires that the second application be notified of some event, its mediation module sends a signal on the event stream. This signal contains no information in itself.
6. When the second application checks if any events ate waiting for it, its mediation module checks the event stream to see if any notifications are waiting on it.
7. When the second application has processed an event, its mediation module removes the event signal from the event stream.

Figure 3:
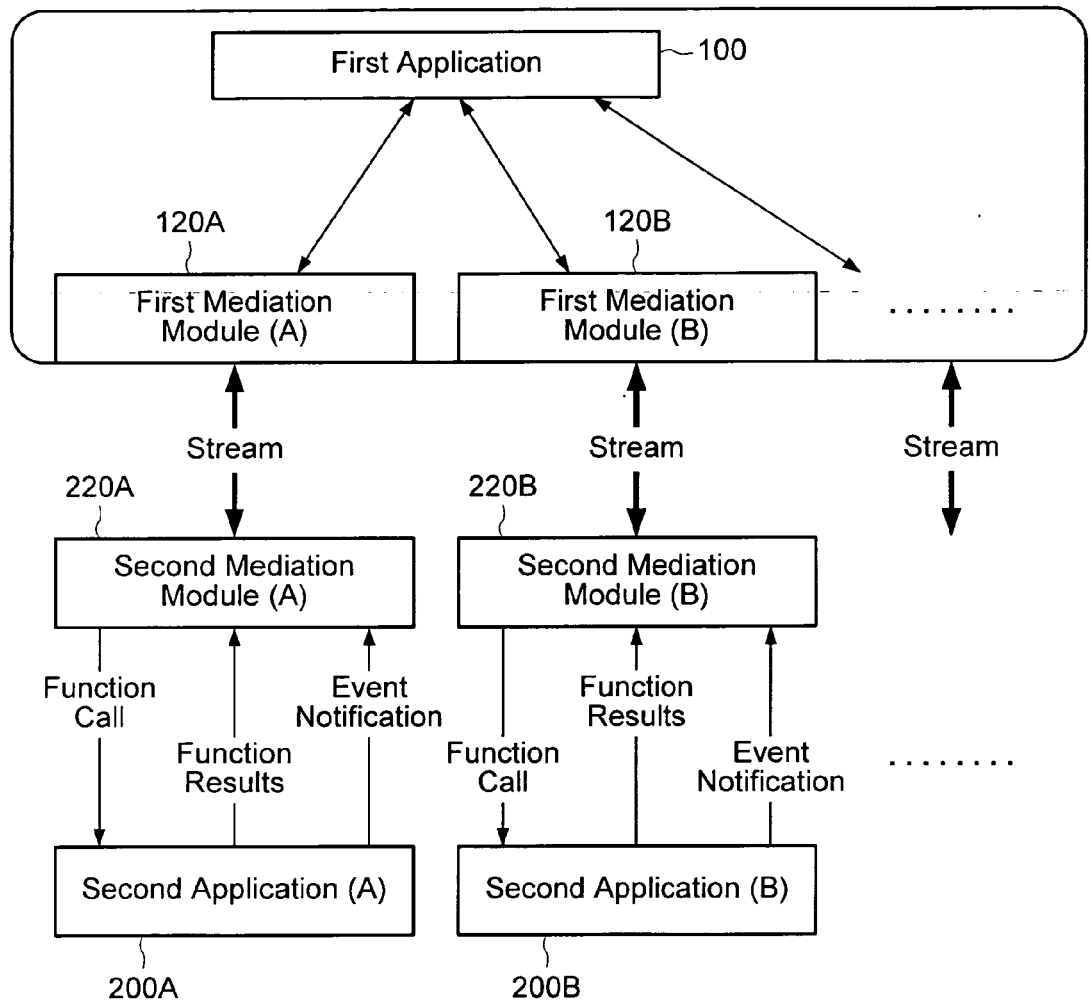
FIG. 3 Shows a diagrammatic illustration of a first application using several mediation modules.

Turning now to FIG. 3, there is shown a diagrammatic illustration of a first application using several mediation modules. A first applications for example a platform independent or interpreted application, may issue several function calls where each function is contained by a separate native code application. FIG. 3 shows a first application 100 communicating with a second application 200A through mediation modules 120A and 220A. The first application 100 may also communicate a second application 200B through mediation modules 120 and 220B.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A computer, comprising:
a platform independent language application configured to run on the computer;
a first mediation module linked to the platform independent language application;
a native language application configured to execute in a native language of a processor of the computer; and
a second mediation module linked to the native language application;
wherein the first mediation module is configured to communicate with the second mediation module to provide communications between the platform independent language application and the native language application;
wherein the second mediation module is configured to send a request for a function reference to the first mediation module, and wherein the request comprises one or more of: a package name, a class name, and a method name of a method to be invoked;
wherein in response to receiving the request, the first mediation module is configured to return the function reference to the second mediation module;
wherein in response to receiving a function call from the native language application, the second mediation module is configured to communicate the function call to the first mediation module using the function reference; and
wherein the first mediation module is configured to pass the function call to the platform independent language application.

2. The computer as recited in claim 1,
wherein in response to receiving a function call from the platform independent language application, the first mediation module is configured to communicate the function call to the second mediation module; and
wherein the second mediation module is configured to pass the function call to the native language application.

3. The computer as recited in claim 2, wherein the second mediation module is configured to translate the function call and associated parameters into a format suitable for the native language application.

4. The computer as recited in claim 2, wherein the first mediation module is configured to communicate the function call and associated parameters to the second mediation module in a stream protocol format.

5. The computer as recited in claim 2,
wherein the native language application is configured to perform the function call and provide corresponding results to the second mediation module;
wherein the second mediation module is configured to communicate the results to the first mediation module; and
wherein the first mediation module is configured to pass the results to the platform independent language application.

6. The computer as recited in claim 5, wherein the first mediation module is configured to translate the results into a format suitable for the platform independent language application.

7. The computer as recited in claim 5, wherein the second mediation module is configured to communicate the results to the first mediation module in a stream protocol format.

8. The computer as recited in claim 1, wherein the first mediation module and the second mediation module are configured to communicate with each other one or more of function calls, function parameters, function results, and event notifications.

9. The computer as recited in claim 1, wherein the platform independent language application is configured to launch the native language application.

10. The computer as recited in claim 9, wherein to launch the native language application, the platform independent language application is configured to cause the first mediation module to issue a command that causes an operating system to launch an instance of the second mediation module and the native language application.

11. The computer as recited in claim 1, further comprising a plurality of native language applications each linked to a corresponding one of a plurality of second mediation modules, wherein the platform independent language application is configured to pass function calls to each of the plurality of native language applications through one of a plurality of first mediation modules and one of the second mediation modules corresponding to the native language application to which a particular function call is being passed.

12. The computer as recited in claim 1, wherein the platform independent language is Java.

13. The computer as recited in claim 1, wherein the first mediation module is configured to translate the function call and associated parameters into a format suitable for the platform independent language application.

14. The computer as recited in claim 1, wherein the second mediation module is configured to communicate the function call and associated parameters to the first mediation module in a stream protocol format.

15. The computer as recited in claim 2,
wherein the platform independent language application is configured to perform the function call and provide corresponding results to the first mediation module;
wherein the first mediation module is configured to communicate the results to the second mediation module; and
wherein the second mediation module is configured to pass the results to the native language application.

16. The computer as recited in claim 15, wherein the second mediation module is configured to translate the results into a format suitable for the native language application.

17. The computer as recited in claim 15, wherein the first mediation module is configured to communicate the results to the second mediation module in a stream protocol format.

18. The computer as recited in claim 1, further comprising a plurality of platform independent language applications each linked to a corresponding one of a plurality of first mediation modules, wherein the native language application is configured to pass function calls to each of the plurality of platform independent language applications through one of a plurality of second mediation modules and one of the first mediation modules corresponding to the platform independent language application to which a particular function call is being passed.

19. A method, comprising:
running a platform independent language application on a computer;
linking a first mediation module to the platform independent language application;
executing a native language application on a processor of the computer; and
linking a second mediation module linked to the native language application;
the first mediation module communicating with the second mediation module to pass communications between the platform independent language application and the native language application;
the second mediation module sending a request for a function reference to the first mediation module, wherein the request comprises one or more of: a package name, a class name, and a method name of a method to be invoked;
wherein in response to receiving the request, the first mediation module returning the function reference to the second mediation module; and
wherein the second mediation module communicating with the first mediation module comprises:
in response to receiving a function call from the native language application, the second mediation module communicating the function call to the first mediation module using the function reference; and
the first mediation module passing the function call to the platform independent language application.

20. The method as recited in claim 19, wherein the first mediation module communicating with the second mediation module comprises:
in response to receiving a function call from the platform independent language application, the first mediation module communicating the function call to the second mediation module; and
the second mediation module passing the function call to the native language application.

21. The method as recited in claim 20, further comprising the second mediation module translating the function call and associated parameters into a format suitable for the native language application.

22. The method as recited in claim 20, wherein the first mediation module communicating the function call to the second mediation module comprises the first mediation module communicating the function call and associated parameters to the second mediation module in a stream protocol format.

23. The method as recited in claim 20, further comprising:
the native language application performing the function call and providing corresponding results to the second mediation module;
the second mediation module communicating the results to the first mediation module; and
the first mediation module passing the results to the platform independent language application.

24. The method as recited in claim 23, further comprising the first mediation module translating the results into a format suitable for the platform independent language application.

25. The method as recited in claim 23, wherein the second mediation module communicating the results to the first mediation module comprises the second mediation module communicating the results to the first mediation module in a stream protocol format.

26. The method as recited in claim 19, wherein the first mediation module communicating with the second mediation module comprises the first mediation module and the second mediation module communicating with each other one or more of function calls, function parameters, function results, and event notifications.

27. The method as recited in claim 19, further comprising the platform independent language application launching the native language application.

28. The method as recited in claim 27, wherein said launching the native language application comprises the first mediation module issuing a command that causes an operating system to launch an instance of the second mediation module and the native language application.

29. The method as recited in claim 19, further comprising:
- executing a plurality of native language applications each linked to a corresponding one of a plurality of second mediation modules;
- the platform independent language application passing function calls to each of the plurality of native language applications through one of a plurality of first mediation modules and one of the second mediation modules corresponding to the native language application to which a particular function call is being passed.

30. The method as recited in claim 19, wherein the platform independent language is Java.

31. The method as recited in claim 19, further comprising the first mediation module translating the function call and associated parameters into a format suitable for the platform independent language application.

32. The method as recited in claim 19, wherein the second mediation module communicating the function call to the first mediation module comprises the second mediation module communicating the function call and associated parameters to the first mediation module in a stream protocol format.

33. The method as recited in claim 19, further comprising:
- the platform independent language application performing the function call and providing corresponding results to the first mediation module;
- the first mediation module communicating the results to the second mediation module; and
- the second mediation module passing the results to the native language application.

34. The method as recited in claim 33, further comprising the second mediation module translating the results into a format suitable for the native language application.

35. The method as recited in claim 33, wherein the first mediation module communicating the results to the second mediation module comprises the first mediation module communicating the results to the second mediation module in a stream protocol format.

36. The method as recited in claim 19, wherein the second mediation module communicating with the first mediation module comprises the second mediation module and the first mediation module communicating with each other one or more of function calls, function parameters, function results, and event notifications.

37. The method as recited in claim 19, further comprising:
- executing a plurality of platform independent language applications each linked to a corresponding one of a plurality of first mediation modules;
- the native language application passing function calls to each of the plurality of platform independent language applications through one of a plurality of second mediation modules and one of the first mediation modules corresponding to the platform independent language application to which a particular function call is being passed.

* * * * *